United States Patent [19]

Stenudd

[11] 4,190,847

[45] Feb. 26, 1980

[54] STRAY INK COLLECTOR FOR IMPACT PRINTER

[75] Inventor: Sven G. V. Stenudd, Lidingo, Sweden

[73] Assignee: Facit Aktiebolag, Atvidaberg, Sweden

[21] Appl. No.: 958,050

[22] Filed: Nov. 6, 1978

[30] Foreign Application Priority Data

Nov. 9, 1977 [SE] Sweden ................................ 7712670

[51] Int. Cl.[2] .......................... G01D 15/20; B41J 9/00

[52] U.S. Cl. ................................ 346/141; 101/93.48; 400/124; 400/701

[58] Field of Search ........................ 346/141, 105, 106; 101/93.48, 93.02; 400/124, 248, 457, 701, 157.1, 157.2, 157.3, 157.4, 191, 247

[56] References Cited

U.S. PATENT DOCUMENTS 4,109,776 8/1978 Stenudd .......................... 346/141 X

*Primary Examiner*—Joseph W. Hartary

*Attorney, Agent, or Firm*—Alfred E. Miller

[57] ABSTRACT

A device for producing imprints on a recording medium having a member acting on the medium which strikes or presss against a surface of the medium in its forward position. The member is in the form of an elongated arm being resiliently connected to a frame or other support. The arm is also provided with means to prevent ink from adhering to the member as a result of the latter striking the printing ribbon and the ink moving between the arm and the impact surface when said arm is in its rear position.

10 Claims, 2 Drawing Figures

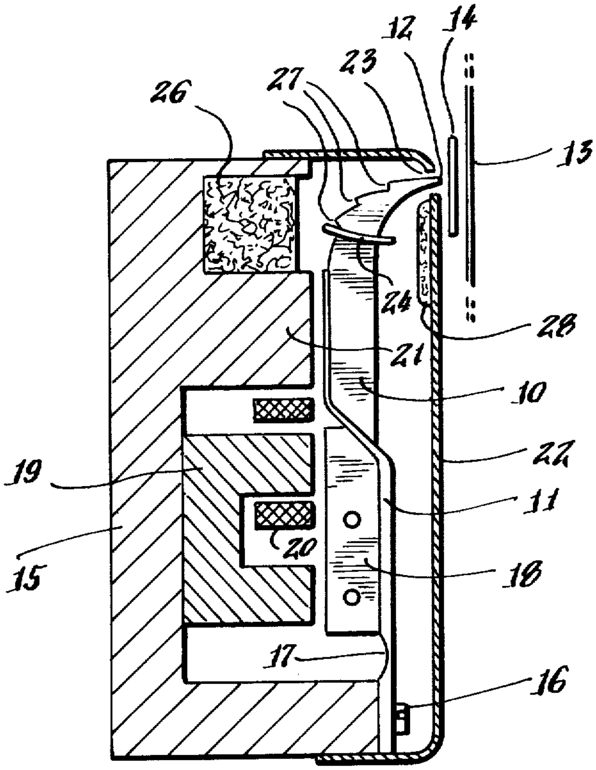
Fig. 1.
Fig. 2.
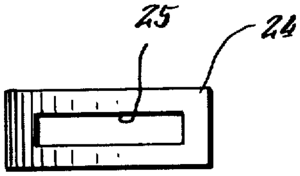

STRAY INK COLLECTOR FOR IMPACT PRINTER

BACKGROUND OF THE INVENTION

Impact printers are known in which an impact member strikes a recording medium through a printing ribbon between said impact member and said recording medium. Thus, when the device and its member is in operation, the latter will strike the printing ribbon repeatedly and adherence of a small quantity of ink to the impacting arm cannot be avoided. Even if this quantity of ink is rather small, it will cause problems after a certain time period because ink will successively collect on the arm and pass inwardly along the arm to ultimately reach the part of the arm which coacts with the impact surface upon retraction. Thus, ink on this part of the arm will result in the tendency of the arm to adhere to the impact surface resulting in a reduced printing speed, and additionally possibly make the device inoperative. This occurrence will result in a relatively short servicing interval which, of course, is a disadvantage with regard to both cost and operational safety.

The present invention relates to a device for producing imprints on a recording medium which has a member acting on the medium designed to strike or press against the surface of the medium through a printing ribbon. The member has an elongated arm which is resiliently connected to the frame or other support, and which is securely mounted relative to the operating member so that the arm, under the action of the operating member, is yieldably pivotable between a rear position that is defined by the arm or by a member attached thereto bearing against an impact surface, which is unyielding relative to the support, and a front position which is the printing position.

An object of the present invention is to improve the foregoing imprinting device in such a manner that ink is prevented from moving in between the arm and the impact surface. This object is achieved in accordance with the teachings of the present invention in that the cross-sectional area of the part of the arm which is located between the member acting on the medium and the part of the arm which coacts with the fixed impact surface, is altered by at least one steep step.

A further object of the present invention is to provide a plate in the form of a collar surrounding said arm above said impact surface and functioning as a collecting device for ink dripping down the arm toward the impact surface.

Another object of the present invention is to provide a porous absorbent material mounted in said support for absorbing the ink that is collected in the collar.

In order that the invention will be more clearly understood, it will now be disclosed in greater detail with reference to the accompanying drawings, in which:

FIG. 1 is a side elevational view, partly in section of the present stray ink collector for an impact printer constructed in accordance with the teachings of my invention; and FIG. 2 is a plan view of a part of said stray ink collector.

DESCRIPTION OF THE PREFERRED EMBODIMENT

As seen in FIG. 1 an arm 10 is shown and a leaf spring 11 supporting the arm. On its free end, the arm 10 has a tip 12 arranged to act on a recording medium 13, for example paper, by striking the latter through a printing ribbon 14. The tip 12 is designed to produce a dot on the medium 13, as in a matrix printer, or, as in other types of printers, have some character for direct recording of a complete symbol on the recording medium 13.

One end of the leaf spring 11 is attached, for example, by screws 16 to a support 15 which is shown diagrammatically in the form of a frame or the like. The leaf spring 11 has a reduced portion 17 in a part thereof bridging the arm 10 and the support 15, the object of which is to provide the required spring function.

The inner end of the arm 10 is connected to an armature 18, and the latter is preferably riveted and/or soldered both to the arm 10 and to the leaf spring 11. An electromagnet comprising a core 19 and a coil 20 is attached to the support 15 and arranged, when energized, to attract the armature 18 and hence also the arm 10. The movement of the arm is limited by the leaf spring 11 striking a projection 21 of the support 15. If desired, it is also possible to limit the movement of the arm by the armature hitting the pole faces of the electromagnet, but to avoid adherence of the arm to the support the projection 21 is usually designed so that an air gap remains between the armature 18 and the pole faces. The risk of adherence is further reduced if a thin foil of non-magnetic material (not shown) is on the pole faces and/or on the impact surface of the projection 21.

The arm 10 is constructed in the form of an elongated plate having its main surfaces arranged at right angles to the main surfaces of the leaf spring 11. The edge areas of the arm are attached to the leaf spring and are preferably soldered thereto. The leaf spring is bent in order to strengthen it, as described more in detail in Swedish patent application 7612496-5, and its upper portion is attached to the left-hand edge area of the arm, as seen in FIG. 1, and its lower portion adjacent to the resilient portion 17 is attached to the opposite edge area of the arm.

A hood 22 protects the device from dust and the like and is attached to the support 15 in a suitable manner. The hood is provided with an opening 23 for the tip 12 of the arm.

In the example shown, energizing of the electromagnet will cause the arm 10, and hence its tip 12, to move away from the recording medium. When the magnetizing current is broken for a short while the spring force of the portion 17 will cause the arm 10 to pivot so that the tip 12 strikes the printing ribbon 14 and the recording medium 13. The arm is caused to return to its initial position by the electromagnet being again energized. If an increase in the printing speed is desired the magnetizing current is suitably connected during the outwardly directed movement of the arm, which is discussed more in detail in Swedish patent application No. 7611256-4.

When the tip 12 strikes the printing ribbon 14 and the recording medium 13 a small quantity of ink is transferred from the printing ribbon to the tip. Since the return movement of the arm ceases very abruptly because of the projection 21 and/or the pole faces of the magnet core 19, this ink will successively pass inwards along the arm. To prevent it from reaching the leaf spring 11 and come in between this spring and the impact surface of the projection 21, the arm between the tip 12 and the leaf spring 11 is provided with an ink catcher in the form of a plate 24 surrounding the arm like a collar. The plate, shown in a plan view, and which is somewhat enlarged in FIG. 2, has a central opening 25 for the arm. When the plate 24 is mounted on the arm 10 the opening 25 is completely filled by the arm. In order to ensure that no small gaps through which ink could pass are formed between the arm and the plate, the plate is soldered to the arm. As seen in FIG. 1, the plate 24 is slightly bent, so as to be concave adjacent the tip 12 of the arm. Thus, ink passing along the arm will be stopped by the plate 24 and collected therein, and the abrupt retardation occurring at the end of the return movement of the arm causes at least part of the ink near the plate to be ejected. A cushion 26 fabricated of some porous material, such as foamed plastic, cotton wool or a cotton mat, is placed in a recess in the support 15 in order to absorb the stray ink collected by plate 24.

As seen in FIG. 1, the arm 10 has several pointed projections 27 on a rear surface thereof between the tip 12 and the plate 24. In addition, these projections will discharge ink droplets on retardation of the arm, and thus provide an even wetting of the cushion 26.

The cushion 26 must have such a size that not even after a long period of operation will it become saturated with ink. It is particularly important that there is a sufficient safety margin relative to the projection 21, since no ink must drip from the cushion 26 on to that area of the projection which serves as impact surface for the leaf spring.

It should be noted the arm, when moving in the opposite direction, i.e. towards the recording medium 13, will end by a relatively strong retardation. Since both the printing ribbon 14 and the recording medium 13 are resilient, and thus will be compressed between the tip 12 of the arm and a base (not shown) for example a roll, about which the recording medium is arranged, the retardation will in this case be considerably softer than at the end of the return movement of the arm. A small quantity of ink will however leave the arm also on this soft retardation, and in order to absorb this ink, a cushion 28 of the same material as the cushion 26 is disposed near the hood 22. However, the cushion 28 is not absolutely necessary since, without it, the ink would only strike the hood 22, and then trickle downwards on the inside of the hood, without causing any direct inconvenience to the operator.

It is to be understood that the invention is, of course, not limited to the embodiment shown but can be modified in many ways within the scope of the following claims. Thus, it is possible, for example, instead of having the collar 24 to increase both the width and the thickness of the arm in steep steps.

What is claimed is:

1. In a device for producing imprints on a recording medium, a member acting on said medium having an elongated arm for striking or pressing against a surface of said medium, a support having an impact surface, means mounting said arm for resilient pivotal movement on said support, an operating assembly for said device on said support, said arm, under the action of said operating assembly, being movable between a rear portion against said impact surface and a front position in which a portion of said arm strikes or presses against said medium which is the printing position, the cross-sectional area of said arm that is between the impact point and the part of the arm which coacts with said fixed impact surface being provided with at least one steep step.

2. A device as claimed in claim 1 wherein said steep step is a plate-shaped part having an aperture and fitted on said arm thereby forming a collar.

3. A device as claimed in claim 2 wherein said plate-shaped part is arched upwardly forming a concave surface facing the portion of said arm which coacts with said impact surface.

4. A device as claimed in claim 2 wherein said plate-shaped part is soldered to said arm.

5. a device as claimed in claim 2 wherein said arm between said plate-shaped part and the portion of the arm coacting with said impact surface has at least one pointed projection.

6. A device as claimed in claim 1 further comprising a cushion of porous absorbent material mounted on said support which is generally arranged on an imaginary line that is an extension of the movement of said arm part located adjacent to said portion of the arm coacting with said impact surface.

7. A device as claimed in claim 6 further comprising a recess in said support for holding said cushion adjacent to said impact surface.

8. A device as claimed in claim 6 further comprising a hood secured to said support enclosing a large part of said arm and another cushion of porous absorbent material mounted on an inside surface of said hood whereby the two cushions are arranged on opposite side of said arm.

9. A device as claimed in claim 8 wherein the material of at least one of said cushions is substantially cotton.

10. A device as claimed in claim 8 wherein the material of at least one of said cushions is foamed plastic.

* * * * *